Nov. 24, 1931. C. M. MacCHESNEY ET AL 1,833,168

STRAP STRETCHING DEVICE

Filed Nov. 19, 1926 2 Sheets-Sheet 1

Nov. 24, 1931.  C. M. MacCHESNEY ET AL  1,833,168
STRAP STRETCHING DEVICE
Filed Nov. 19, 1926.  2 Sheets—Sheet 2
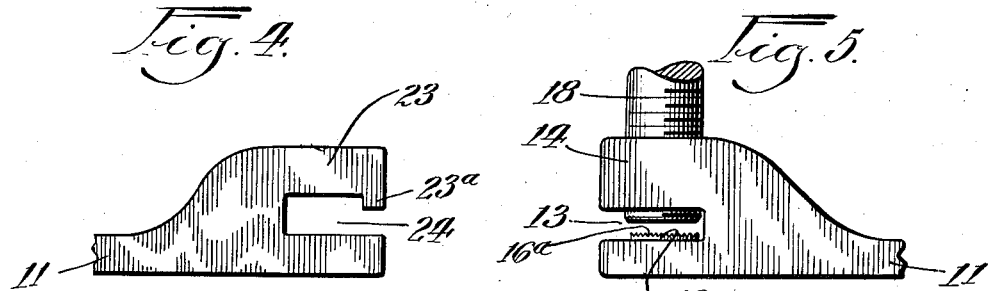
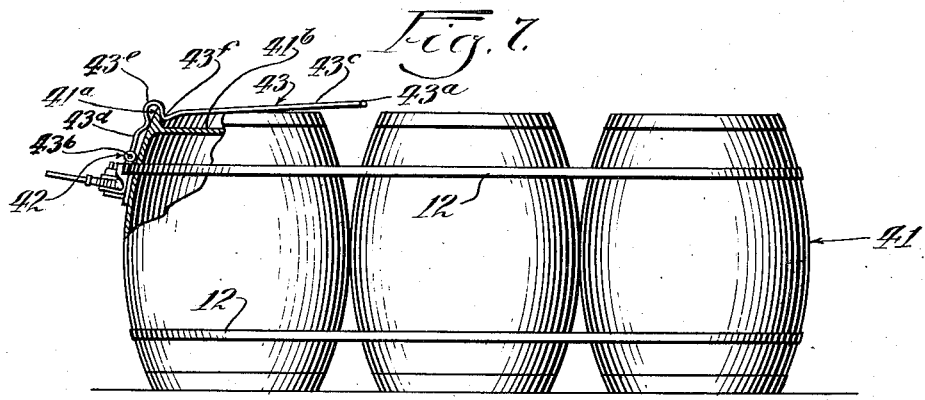
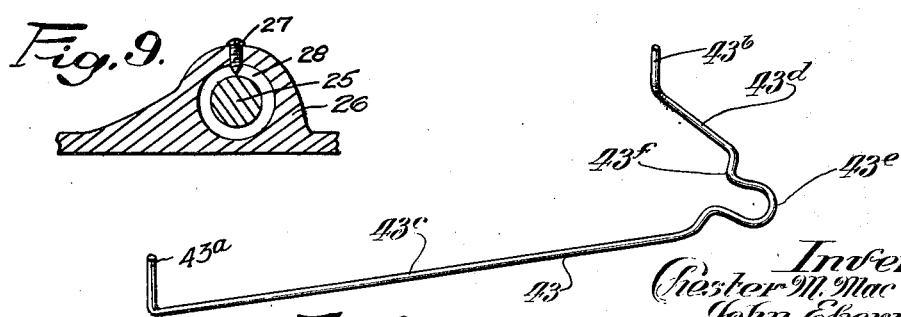
Inventors:
Chester M. MacChesney,
John Ekern Ott.
By Rector, Hibben, Davis & Macauley,
Attys.

Patented Nov. 24, 1931

1,833,168

UNITED STATES PATENT OFFICE

CHESTER M. MacCHESNEY AND JOHN EKERN OTT, OF CHICAGO, ILLINOIS, ASSIGNORS TO ACME STEEL COMPANY, OF CHICAGO, ILLINOIS, A CORPORATION OF ILLINOIS

STRAP STRETCHING DEVICE

Application filed November 19, 1926. Serial No. 149,306.

This invention relates to improvements in strap stretching devices and its purpose is to provide means for engaging and stretching or drawing taut a metal strap or other flexible member which has been passed around a box, package or group of objects, the present invention being of particular advantage when used as a means for stretching the strap or flexible member preliminary to the fastening of the overlapping ends of the strap by means of a seal or other fastening means. The principal object of the invention is to provide a strap stretching device having an unusual capacity for taking up slack in the strap. Another object is to provide a device for taking up slack in a strap without supporting the base of the device or preventing turning movements thereof by any external means other than the strap itself during the operation of taking up the slack. A further object is to provide a strap stretching device having improved means for forming a detachable engagement with the strap. Still another object is to provide a strap stretching device comprising a frame structure having means for clamping one end of the strap and comprising a rotatable device for engaging the other end of the strap and winding it on a drum. Still another object is to provide improved means for supporting the strap stretching device while it is in use. Another important feature of the invention is the provision of a reversible supporting tool adapted for applying the strap stretching device on a box or package in a plurality of different positions. Other objects relate to various features of construction and arrangement which will appear more fully hereinafter.

The nature of the invention will be understood from the following specification taken with the accompanying drawings in which one embodiment is illustrated. In the drawings, Figure 1 shows a top plan view of the improved strap stretching device with a portion thereof shown in horizontal section through the axis of the rotatable drum; Fig. 2 shows a side elevation of the device illustrated in Fig. 1; Fig. 3 shows a longitudinal vertical section taken on the line 3—3 of Fig. 1; Fig. 4 shows a partial end elevation of the left end of the frame as viewed in Fig. 2; Fig. 5 shows a partial end elevation of the right-hand end of the device as viewed in Fig. 2; Fig. 6 shows a side elevation of a group of barrels having a strap in position to be applied thereto by means of the device of the present invention, illustrating the reversible supporting tool for maintaining the stretching device in operative position; Fig. 7 shows a side elevation of a group of barrels illustrating the adaptation of the reversible supporting tool to stretch a strap in a different location around a group of barrels; Fig. 8 shows a perspective view of the improved reversible supporting tool; and Fig. 9 is a detail sectional view taken on the line 9—9 of Fig. 1.

As illustrated in the drawings, the invention comprises a frame member 10 having a flat base plate 11 which is adapted to seat against the surface of the box or other object about which the metal strap 12 is to be stretched or rendered taut. The strap 12 is preferably a sheet metal strap which is relatively wide as compared with its thickness and which is particularly flexible to be wound on a drum. After this strap has been passed around the box, package or group of objects, the strap stretching device is placed in position adjacent to or in contact with the object to be strapped and one end portion of the strap is passed into engagement with the slot 13 which is formed beneath the boss 14 carried by the plate 11 and spaced upwardly therefrom as illustrated in Figs. 2 and 5. The base plate 11 is provided beneath the boss 14 with a circular depression or recess 15 in which is located a hard metal gripping member 16 having an upper knurled surface 16ª adapted to engage the under side of the strap 12. A small opening 17 leads through the bottom wall of the recess 15 so that a small tool may be inserted to release the gripping member if it becomes fixed on its seat. The gripping member is ordinarily detained against upward movement either by the strap 12 or by the proximity of the lower end of the clamping screw 18 which threadedly engages the boss 14, as shown in Fig. 3. The clamping screw 18 is provided at its upper end with a handle 19 by which it may be manipulated by the operator to cause the lower end of the adjusting screw to engage the upper side of the strap and force it against the gripping member 16.

With one end portion of the strap 12 held securely in fixed position with respect to the frame 10, the other end portion of the strap which has been passed around the object or group or objects to be strapped can be drawn up to stretch the strap and render it taut. This drawing up of the strap to remove the slack therein is effected by means of a rotatable drum 20 which is journalled in the hub 21 formed integrally with the frame structure 10. The hub 20 projects beyond the hub 21 and the projecting portion thereof is provided with two right-angularly disposed intersecting slots 22 extending inwardly from the end of the drum, thus permitting the free end of the strap 12 to be passed edgewise into engagement with either one of these slots. At the ends of the slot which are thus engaged by the strap, the strap is bent transversely, as shown in Fig. 2, and passed around the surface of the drum. The end portion $12^a$ of the strap which is gripped by the clamping screw 18 and the gripping member 16 is extended toward the left, as shown in Fig. 2, beneath a boss 23 which is spaced upwardly from the base plate 11 to form a strap receiving slot 24. The free end portion $12^b$ of the strap which is passed into engagement with a slot of drum 20 is also passed into engagement with the slot 24 above the portion $12^a$ of the strap and, during the process of stretching the strap or drawing it taut, these superimposed portions of the strap $12^a$ and $12^b$ are retained in position beneath the boss 23 by means of a depending flange $23^a$ which is formed thereon to extend downwardly at the outer edges of the strap, as illustrated particularly in Fig. 4. The boss 23 serves not only to maintain the overlapping ends of the strap in position and alignment but acts also to resist the turning moment set up in the base of the device by the actuation of the handle 30 and the rotation of the drum 20, so that the device is permitted to stretch the strap effectively without necessarily causing the forces exerted on the handle 30 to be opposed by contact of the device with the object to be strapped or by any other external agency.

With the parts of the strap thus disposed with respect to the frame structure 10, the drum 20 can be rotated to render the strap taut and this is effected by means of certain operating mechanism connected with the reduced portion 25 of the drum 20. This part 25 is journaled in a hub 26 carried by the frame 10 at the rear edge thereof, as viewed in Fig. 1, the drum and its reduced portion 25 being retained in place in the hubs 21 and 26 by means of a screw 27 which passed upwardly through the base plate 11 to engage an annular groove 28 formed in the member 25 within the hub 26. The drum 20 extends inwardly beyond the inner face of the hub 21 and the reduced cylindrical portion $25'$ of the drum extends inwardly beyond the other hub 26, these two cylindrical portions of the drum which thus project inwardly serving as bearings for a lever arm 29 which is threadedly engaged at its outer edge by an operating handle 30. The lever arm 29 is provided with side plates $29^a$ which engage the inwardly projecting cylindrical portions of the drum 20 and the reduced portion 25 thereof and these side plates $29^a$ are adapted to receive between them a ratchet wheel 31 having a central aperture of rectangular cross-section which fits on the rectangular portion $25^a$ of the reduced portion of the drum. This ratchet wheel 31 is normally held against rotation by means of a detent 32 which slidably engages a recess 33 extending into the boss 34 formed on the upper side of the base plate 11. A coil spring 35 is seated in the lower end of this recess and tends normally to force the detent 32 upwardly into engagement with the ratchet teeth, as illustrated more particularly in Fig. 3, where the detent 32 is shown as having a sharp tooth $32^a$ the sides of which are inclined to correspond with the inclination of the teeth of the ratchet wheel 31. The rotation of the ratchet wheel and the consequent rotation of the drum 20 are effected upon the reciprocation of the lever 29 and its handle by the operation of a pawl 36 which is mounted in the bore 37 of the lever and which has a sharp tooth $36^a$ provided with faces of such inclination that the pawl will slide over the ratchet teeth in one direction but will effect rotation of the ratchet wheel when moved in the other direction. A coil spring 38 is mounted in the bore 37 between the pawl 36 and the inner end of the handle 30, thus serving normally to force the pawl inwardly into engagement with the ratchet teeth.

The parts of the operating mechanism which serve to wind up the strap may be disassembled by removing the screw 27 which permits the drum to be withdrawn from engagement with the hubs 21 and 26, thereby freeing the lever 29 and the ratchet wheel 31. Upon removal of the lever 29 and the ratchet wheel from the recess between the hubs 21 and 26, the detent 32 and pawl 36, together with their cooperating springs, may be removed from the recesses in which these parts are located. The simple method of assembly and disassembly which is thus made possible is of great advantage in tools of this kind which are adapted for use in shipping rooms by men who are not mechanics.

With the parts of the operating mechanism assembled on the frame 10 in the manner illustrated in the drawings, the reciprocation of the handle 30 will serve to wind up the free end portion 12ᵇ of the strap on the projecting portion of the drum 20 which is preferably of a sufficient diameter to permit a considerable portion of the strap to be wound thereon and thereby allow the taking up of a relatively large amount of slack in the strap which has been passed around the box or other object or group of objects being reinforced by the strap. After the strap has been rendered taut, the superimposed portion thereof which projects beyond the boss 23 may be secured together preferably at the end of the part 12ᵃ by means of a seal 40 or other suitable securing device. When this seal has been put in place, the screw 18 may be turned to release the strap and after the portion 12ᵇ of the strap has been passed out of engagement with the drum 20, the projecting end of this part of the strap may be cut off to leave a smooth joint free of objectionable projections.

Although this strap stretching device may be employed with advantage in applying straps to various objects or groups of objects, it may be employed with particular advantage in applying a strap in contact with the vertical sides of a box, barrel or group of objects, as illustrated particularly in Figs. 6 and 7, where the device is shown in connection with the application of reinforcing straps around the sides of a group of barrels 41. In this instance two reinforcing straps are employed, one located adjacent the upper ends of the barrels and the other located adjacent their lower ends. During the process of applying the strap around the barrels it is desirable that the strap stretching device be supported so that the hands of the operator will be free to manipulate the ends of the strap and the operating handle 30. The base plate 11 of the frame 10 is therefore provided in alignment with the axis of the drum 20 with a cylindrical boss 42 having a longitudinal aperture therethrough extending parallel to the edge of the base plate. This boss 42 is adapted to receive either of the extremities 43ᵃ or 43ᵇ of a reversible supporting tool 43 having the form illustrated particularly in Fig. 8. The extremity 43ᵃ is connected to a long arm 43ᶜ and the extremity 43ᵇ is connected to a relatively short arm 43ᵈ, these arms being disposed to each other at substantially a right angle and being connected to each other by a U-shaped part 43ᵉ having curved inward projections 43ᶠ uniting it with each of the arms. When the strap stretching device is being employed for applying the lower strap around the barrels 41, as shown in Fig. 6, the extremity 43ᵃ of the supporting tool 43 is passed into engagement with the boss 42 of the frame 10 and the short arm 43ᵈ is extended over the top of the barrel with the loop 43ᵉ engaging the top annular edge 41ᵃ of the barrel and with the extremity 43ᵇ engaging the top edge 41ᵇ of the barrel. The parts of the barrel thus cooperate with the tool 43 to form a self-sustaining support for the strap stretching device. When the operator wishes to stretch the strap around the upper portions of the group of barrels, as illustrated in Fig. 7, the tool 43 is reversed so that the extremity 43ᵃ thereof engages the boss 42 of the strap stretching tool while the long arm 43ᶜ of the supporting tool extends over the top of the barrel. The supporting tool is retained in position, as before, by the engagement of the U-shaped part 43ᵉ with the upwardly extending annular edge of the barrel. During the operation of the device for stretching the strap, the device travels around the object being strapped, toward the left as viewed in Figs. 1 and 2, so that when the stretching device is supported by the tool 43, as indicated in Figs. 6 and 7, the boss 42 gradually passes out of engagement with one or the other of the extremities 43ᵃ or 43ᵇ of the tool. After that disengagement occurs, there will be a sufficient tension in the strap so that the device will be conveniently supported without any auxiliary supporting means and when the strap has been completely tightened and a seal applied, the device may be removed from its position beneath the strap, after releasing the screw 18, without encountering the difficulty of having to remove a fixed support. The automatic disengagement of the supporting tool 43 and the strap stretching device during the operation of stretching also permits the base of the strap stretching device to travel into the space between adjacent barrels so that there is nothing under the strap where it would otherwise be in contact with the barrels and the device may be more readily removed after a seal has been applied.

During the operation of rotating the drum to wind up the strap and render it taut, the base plate 11 is held from turning by the engagement of the boss 23 with the overlapping ends of the strap, thus maintaining the axis of rotation of the drum at right angles to the longitudinal axis of the strap, while at the same time making it unnecessary to provide any external support for resisting the turning moment set up by the forces applied to the operating handle 30. This boss 23 also performs the important function of maintaining the overlapping ends of the strap adjacent to each other and in alignment so that the seal 40 may be conveniently applied by the operation of a suitable tool which will cut and bend portions of the strap and seal, as illustrated in the drawings, or otherwise crimp or bend the parts in order to form a permanent joint. This improved stretching device may also be employed with advantage on the top of a box or other object about which a strap has been passed and when so used it will serve to maintain the overlapping ends of the strap in the proper relation for the application of the seal. When the stretching device is used for tightening a strap which has been passed around a group of boxes or other objects, the base plate may be arranged to span a considerable space, such as an opening between adjacent boxes, thus permitting the stretching device to be located firmly in place before the lever is operated to tighten the strap.

Although one form of the invention has been shown and described by way of illustration, it will be understood that it may be embodied in various other forms within the scope of the appended claims.

We claim:

1. A strap stretching device comprising a base plate having a boss forming a slot to receive a strap, said base plate having a circular recess therein beneath said boss terminating in a relatively small hole extending through the base plate, a gripping member removably seated in said recess beneath said boss, an adjustable gripping member threadedly engaging said boss for engaging the upper side of a strap seated on said first named gripping member, and stretching mechanism carried by said base plate for engaging the other end of said strap and pulling it taut around an object engaged by said base plate.

2. A strap stretching device comprising a base plate, means mounted on said base plate for securing one end of a strap in fixed position with said strap extending beyond said securing means over said base plate, stretching mechanism mounted on said base plate for engaging the other end of said strap and pulling it taut, and a boss mounted on said base plate and extending over both ends of said strap on the side of said stretching mechanism opposite said securing means, said boss having a flange extending toward said base plate to retain the strap beneath said boss and to prevent the turning of said base plate.

3. A strap stretching device comprising a frame having spaced bearing hubs, a rotatable drum journalled in said bearing hubs and having a projecting end adapted to engage a strap, a ratchet wheel mounted on the intermediate part of said drum between said bearing hubs, lever mechanism for operating said ratchet wheel, and means carried by said frame and engaging said drum for securing it against longitudinal displacement in said bearing hubs.

4. A strap stretching device comprising a frame having spaced bearing hubs, a rotatable drum journalled in said bearing hubs and having a projecting end adapted to engage a strap, a ratchet wheel mounted on the intermediate part of said drum between said bearing hubs, lever mechanism for operating said ratchet wheel, said drum being provided with an annular groove within one of said bearing hubs, and a pin detachably engaging said groove for normally retaining said drum in engagement with said bearing hubs.

5. A strap stretching device comprising a frame adapted to seat against an object to be strapped, strap stretching mechanism mounted on said frame, and a supporting tool having a pair of angularly disposed arms of different length, either of said arms being adapted to detachably engage said frame and the other of said arms being adapted to extend over the top of said object to be strapped.

6. A strap stretching device comprising a frame provided with a recess, strap stretching mechanism carried by said frame, and a supporting tool provided with a pair of angularly disposed arms of different length, each of said arms having an extremity adapted to engage said recess of said frame.

7. A strap stretching device comprising a frame provided with a recess, strap stretching mechanism carried by said frame, and a supporting tool provided with a pair of angularly disposed arms of different length, each of said arms having an extremity adapted to engage said recess of said frame, said arms of said supporting tool being united by a U-shaped part.

8. A strap stretching device comprising a frame, strap stretching mechanism mounted on said frame, and means attached to said frame for supporting said strap stretching mechanism adjacent an object to be strapped, said means being automatically disengaged from said frame during the operation of said stretching mechanism.

9. A strap stretching device comprising a frame, strap stretching mechanism mounted on said frame for stretching a strap passing around an object to be reinforced, a boss carried by said frame and having an aperture extending in the direction of said strap, and a supporting tool having a part engaging said aperture, the operation of said strap stretching mechanism being adapted to move said device along the length of said strap and thereby disengage said boss from said tool.

10. A strap stretching device comprising a base having stretching mechanism mounted thereon, and a pair of bosses at the ends of said base adapted to engage said strap, one of said bosses having means to hold the strap and the other of said bosses being adapted to prevent a turning motion of the device.

11. A strap stretching device comprising a frame having a pair of spaced bearings of different internal diameters, a drum journaled in said bearings and having a projecting part to engage a strap to be wound thereon, means for removably securing said drum in said bearings, said drum having parts of different diameter engaging said respective bearings, an operating member having spaced parts each journaled on one of said parts of said drum of different diameter, a ratchet wheel secured on said drum between said parts of said operating member, and a pawl carried by said operating member for engaging said ratchet wheel.

12. A strap stretching device comprising a flat base plate adapted to rest upon an object about which a strap is to be stretched taut, a hub formed on said base plate, a drum detachably and rotatably mounted in said hub and having a part projecting from one side of said hub over one lateral portion of said base plate for detachably engaging one end portion of a strap which extends over said base plate, a lever mounted for pivotal movement about said drum in a plane extending parallel to said strap, operating mechanism actuated by the reciprocation of said lever for effecting the rotation of said drum, said base plate having a part located in alignment with the projecting part of said drum for engaging one side of another end portion of said strap, and movable gripping means carried by said base plate over said last named part of said plate for effecting the gripping of said last named end of said strap.

In testimony whereof, we have subscribed our names.

CHESTER M. MacCHESNEY.
JOHN EKERN OTT.